US006209810B1

(12) United States Patent
Brisard

(10) Patent No.: US 6,209,810 B1
(45) Date of Patent: Apr. 3, 2001

(54) ELECTRICAL HOUSEHOLD APPLIANCE FOR PREPARING FOOD COMPRISING A SAFETY DEVICE

(75) Inventor: Pierre Brisard, Conde sur Vire (FR)

(73) Assignee: Moulinex S.A., Paris (FR)

( * ) Notice: Subject to any disclaimer, the term of this patent is extended or adjusted under 35 U.S.C. 154(b) by 0 days.

(21) Appl. No.: 09/381,997
(22) PCT Filed: Mar. 27, 1998
(86) PCT No.: PCT/FR98/00644
§ 371 Date: Mar. 8, 2000
§ 102(e) Date: Mar. 8, 2000
(87) PCT Pub. No.: WO98/43522
PCT Pub. Date: Oct. 8, 1998

(30) Foreign Application Priority Data

Mar. 28, 1997 (FR) .................................................. 97 03813

(51) Int. Cl.⁷ ..................................................... B02C 25/00
(52) U.S. Cl. .......................................................... 241/37.5
(58) Field of Search ............................. 241/37.5, 36, 34, 241/282.1, 282.2

(56) References Cited

U.S. PATENT DOCUMENTS 4,373,677  2/1983  Kunihiro .
5,353,697 * 10/1994  Venturati et al. ................... 241/37.5

FOREIGN PATENT DOCUMENTS 11 65 215      3/1964  (DE) .
2 018 930     10/1979  (GB) .
WO 96/22720   8/1996   (WO) .

* cited by examiner

Primary Examiner—Mark Rosenbaum
(74) Attorney, Agent, or Firm—Young & Thompson

(57) ABSTRACT

The invention concerns a household appliance comprising a housing (1) containing a motor (3) whereof the output shaft rotates an implement (13) housed in a bowl (8) whereon is fixed a lid (15) including a tab (23); and a safety device comprising a sliding vertical plunger (29) actuated by a control button (33) mounted movable on the housing between an off-position and an on-position, means (50, 52) for locking the button (33) in off-position when the lid is not fixed on the bowl, and for unlocking said button (33)when the lid is properly fixed on the such that the plunger (29) takes up a low position wherein it actuates a switch (27) to control the closure of the motor power supply, and retaining means (52, 54) co-operating with the lid tab (23) to prevent the latter from opening when the plunger (29) is in low position. The invention is characterized in that the safety device further comprises means (63) for maintaining the plunger (29) in low position when the switch (27) is locked in closed position.

9 Claims, 2 Drawing Sheets

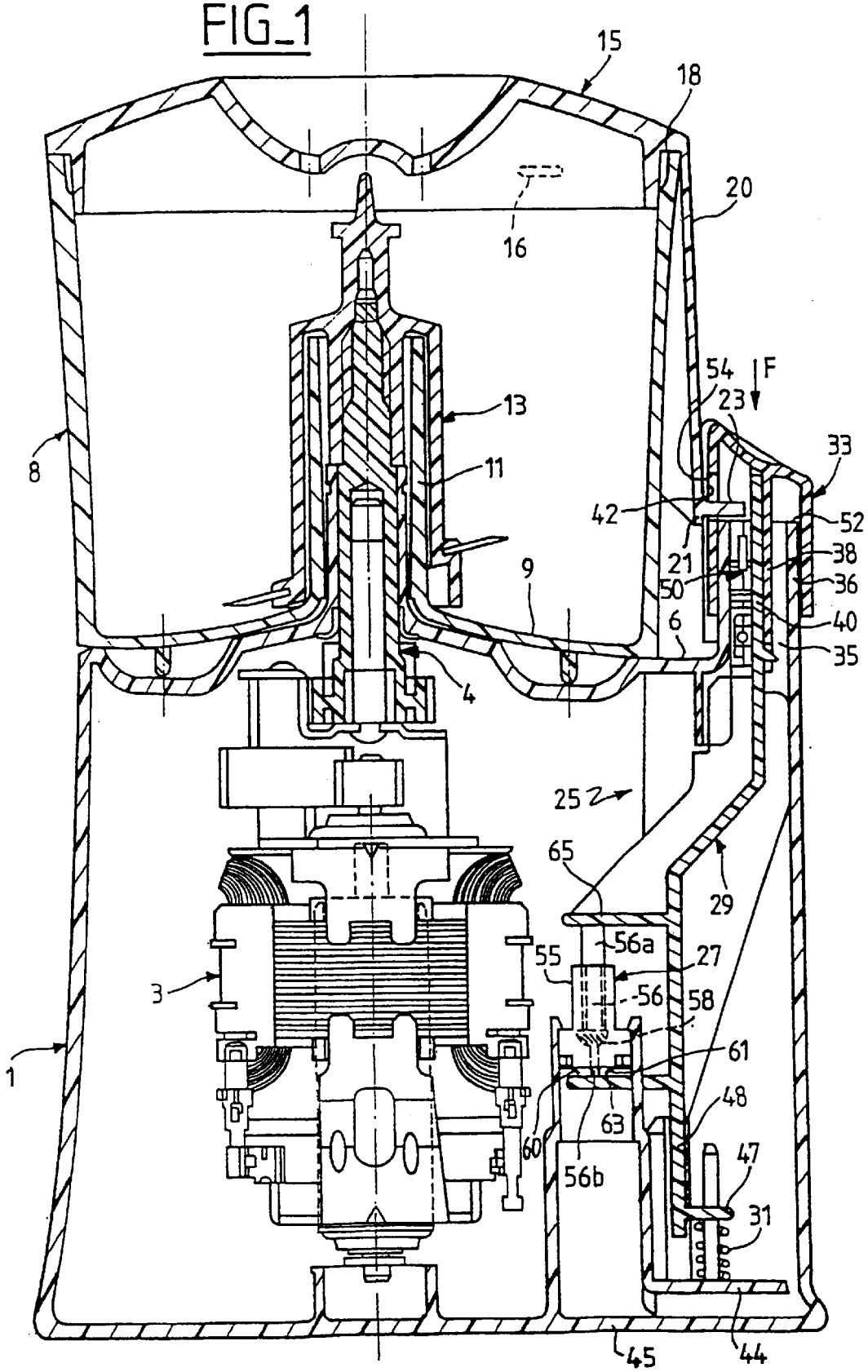
FIG_1

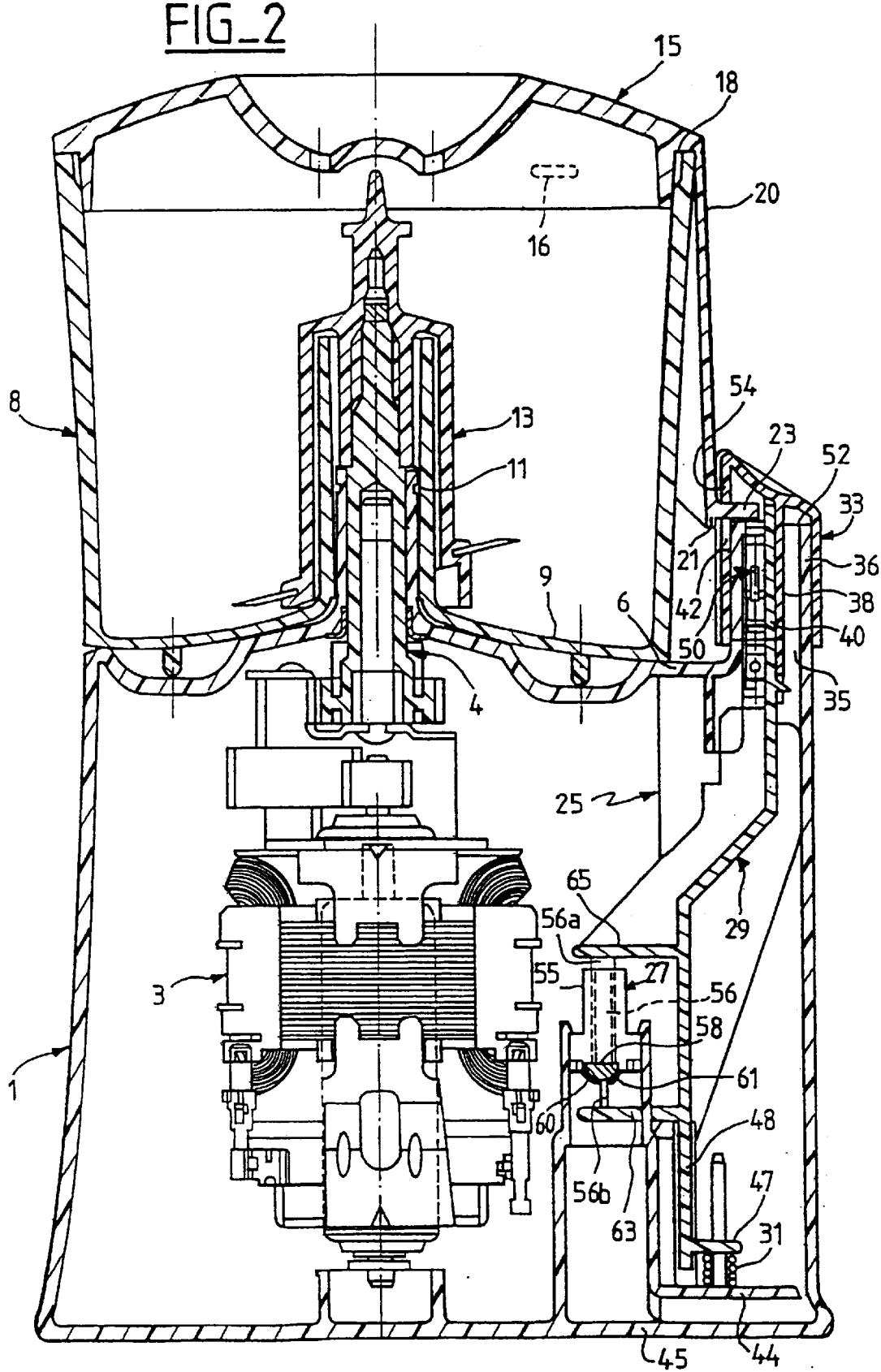
FIG_2

ELECTRICAL HOUSEHOLD APPLIANCE FOR PREPARING FOOD COMPRISING A SAFETY DEVICE

The present invention relates to an electric household appliance for the preparation of foodstuffs, such as for example a chopper, comprising a housing enclosing an electric motor group whose output shaft projects from the housing and is adapted to drive in rotation a working tool disposed within a bowl on which is fixed a removable cover comprising a tongue fixed on the periphery of the cover; and a safety device comprising a switch arranged in the electrical supply circuit of the motor, a control pusher for the switch vertically slidably mounted within and on the periphery of the housing, associated with a return spring, and actuated by a manual control member fixedly connected to the pusher and movably mounted on the housing between a stop position and a start position, means permitting, on the one hand, locking the manual control member in the stop position when the cover is not correctly fixed on the bowl such that the pusher remains in an upper position in which it does not actuate the switch, and on the other hand, to unlock this manual control member in the stop position when the cover is correctly secured on the bowl such that, by manipulating the control member toward its start position, the pusher slides to a lower position in which it controls the closing of the switch to permit supply to the motor, as well as retaining means coacting with the tongue of the cover to prevent opening this latter when the pusher is moved toward its low position.

In known electric household appliances with manual control of this type, the safety device permits the starting of the apparatus by actuating the manual control member toward its start position only when the cover is correctly secured on the bowl, whilst preventing in the course of operation of the apparatus the opening of the cover thanks to the retaining means coacting with the tongue of the cover, thereby permitting protecting the user from any risk of harm which would be due to the moving working tool, generally constituted by a slicing tool which is considered dangerous, if the apparatus were started when the cover is not correctly secured on the bowl or if the cover was removed in the case of operating the apparatus. At the end of preparing the foodstuff, the pusher rises again to its upper position under the force of its return spring, so that the switch leaves its open position to cut the electrical supply to the motor, and the manual control member which is fixedly connected to the pusher is then returned to the stop position in which the cover can then be opened and removed.

Although such electric household appliances offer effective safety to the user, there nevertheless remains the risk of harm to the user in the case in which the switch is blocked in its closed position due for example due to sticking of the fixed and movable contacts of the switch, or else to a fault in manufacture of the switch. Thus, in this case, the pusher rises under the action of its return spring, carrying with it the manual control member toward its stop position, and the cover can then be opened and removed; the motor being still supplied, the working tool continues to turn in the bowl without the cover, which is dangerous to the user if he accidentally introduces his hand into the open bowl.

The invention has particularly for its object to overcome this risk and to provide an electric household appliance, of the type mentioned above, in which the safety device offers complete safety to the user.

According to the invention, the safety device comprises means permitting holding the pusher in the lower position when the switch is stuck in its closed position.

Thus, it will be understood that by preventing the pusher from rising to its upper position in the case in which the switch is stuck in its closed condition, the manual control member cannot then be brought toward its top position, and it is hence impossible to take the cover off the bowl. The user must then unplug the apparatus to stop the motor before proceeding to a subsequent disassembly of the appliance.

For a switch of the type comprising a body in which is vertically slidably mounted a contact pusher which has two end positions, respectively upper and lower, projecting from the body, and which carries, adjacent its lower end, a metal ring serving as a movable contact adapted to coact with two fixed contacts mounted on said body, and according to a preferred embodiment of the invention, the pusher is permanently urged against the upper end of the contact pusher, and the holding means of the pusher in the lower position is constituted by a first tongue fixedly mounted on the pusher and which permanently bears against the lower end of the contact pusher.

Preferably, the pusher and the first tongue are made of a single piece of plastic material.

Thus, this continuously urged tongue which is a permanent part of the pusher constitutes a simple member, inexpensive and easy to make, reliable, and completely adapted to mass production.

The characteristics and advantages of the invention will become further apparent from the following description, by way of non-limiting example, with reference to the accompanying drawings, in which:

FIG. 1 is a schematic cross-sectional view of an electric household appliance according to the invention, showing the cover correctly secured to the bowl and before starting the appliance; and FIG. 2 is a view similar to FIG. 1, the apparatus being in operation and the switch being held in its closed position.

The electric household appliance shown in FIGS. 1 and 2 is an electric chopper comprising a housing forming a base 1, enclosing an electric motor group 3 whose output shaft 4 projects vertically from the upper surface 6 of the housing 1. This housing 1 is surmounted by a removable bowl 8 adapted to contain the foodstuffs to be chopped and has on its bottom wall 9 a vertical chimney 11 in which engages the output shaft 4 of the motor 3. The bowl 8 houses a rotating working tool 13, such as a knife, which is fitted over the chimney 11 and which is coupled in rotation with the output shaft 4 of the motor 3.

The bowl 8 is closed by a removable cover 15 by means of a securement system of the bayonet type, of which one of the elements is designated at 16 in FIGS. 1 and 2.

The upper edge 18 of the cover 15 bears a large tongue 20 directed downwardly and outwardly relative to the bowl 8 and which itself carries, adjacent its lower free end 21, a lip 23 perpendicular to this tongue and directed outwardly. After securement of the cover 15 on the bowl 8 by rotation of the cover, the lip 23 is at a certain height above the upper surface 6 of the housing 1.

The housing 1 also encloses a safety device, designated by the general reference numeral 25 in FIGS. 1 and 2, which comprises a switch 27, whose detailed structure will be explained later, arranged in a manner known per se in the electrical supply circuit of the motor 3, and a control pusher 29 for the switch which is mounted vertically slidably at the periphery of the housing 1 being associated with a return spring 31, and which is actuated by a manual control member 33 fixedly connected to the pusher 29 and movably mounted on the housing 1 between a stop position (FIG. 1) and a slide position (FIG. 2).

In the embodiment shown in FIGS. 1 and 2, the pusher 29 is laterally spaced from the switch 27 and is disposed in a vertical integral bulge 35 that projects at the periphery of the housing 1, and whose upper portion 36 rises to a certain height above the upper surface 6 of the housing 1.

In this embodiment, the manual control member 33 is a pushbutton vertically mounted on the upper portion 36 of the bulge 35 of the housing 1, in vertical prolongation from the pusher 29, and which internally carries a vertically downwardly extending lip 38 fixed on the upper vertical portion 40 of the pusher 29 by any appropriate securement means.

With respect to FIG. 1, the pushbutton 33 comprises, on its surface directed toward bowl 8, a slot 42 opening on one of the lateral sides of the pushbutton 33 and extending into this latter in a direction parallel to the upper surface 6 of the housing 1 by being located at the same height above the upper surface 6 of the housing as the lip 23 of the cover 15. In the correct connecting position of the cover 15 on the bowl 8, the lip 23 is engaged in the slot 42 of the pushbutton 33, as shown in FIGS. 1 and 2.

As is seen in FIGS. 1 and 2, the return spring 31 of the pusher 29 is interposed between a horizontal bearing surface 44 formed in the housing 1, adjacent the bottom wall 45 of this latter, and a small horizontal T-shaped wing 47 formed on the lower vertical portion 48 of the pusher 29.

The safety device 25 comprises means permitting locking the pushbutton 33 in the stop position when the cover 15 is not correctly connected to the bowl 8, which is to say when the lip 23 of the cover 15 is not engaged in the slot 42 of the pushbutton 33. In one embodiment, the blocking means are constituted by a lock, shown schematically at 50 in FIG. 1, mounted resiliently on the upper portion 40 of the pusher 29 and adapted itself to block the pushbutton 33 relative to the upper edge 52 of the bulge 35 of the housing 1. The pushbutton 33 in stop position being thus locked when the cover 15 is not correctly secured on the bowl 8, it is impossible for the user to push the pushbutton downwardly.

Such that the pusher 29 is not actuated and hence remains in a raised rest position in which it does not actuate the switch 27.

These locking means of the pushbutton 33 also constitute means permitting unlocking this pushbutton 33 in the stop position when the cover 15 is correctly connected to the bowl 8, which is to say when the lip 23 of the cover is engaged in the slot 42 of the pushbutton 33, as shown in FIG. 1. Thus, upon this engagement of the tongue 23 of the cover 15 in the slot 42 of the pushbutton, the lip 23 acts on the lock 50 to disengage it sufficiently from the upper edge 52 of this bulge 35 of the housing 1, such that the pushbutton 33 will be freed. The pushbutton 33 in stop position being thus unlocked, the user can push down the pushbutton, in the direction of the arrow F in FIG. 1, which passes then from the start position and which involves a sliding of the pusher 29 toward a low working position in which it actuates the switch 27 to control the closure of the electrical supply circuit of the motor 3, as shown in FIG. 2.

The safety device 25 also comprises a retaining means coacting with the lip 23 of the cover 15 to prevent opening of this latter when the pusher 29 is moved toward its lower position by manipulating pushbutton 33, the cover 15 being correctly secured to the bowl 8. In the embodiment shown in FIGS. 1 and 2, these retaining means are constituted by an upper edge 54, in the shape of a notch, of the slot 42 of the pushbutton 33 which holds the lip 23 of the cover 15 against the upper edge 52 of the bulge 35 of the housing when the user pushes down the pushbutton 33, as shown in FIG. 2.

According to the invention, the safety device comprises means permitting holding the pusher 29 in its lower position when the switch 27 (FIG. 2) is held closed.

With respect to FIGS. 1 and 2, the switch 27 comprises a body 55 in which is slidably mounted a vertical contact pusher 56 which has two free ends, respectively an upper end 56a and a lower end 56b, projecting from the body 55, and which carries, adjacent its lower end 56b, a metallic ring 58 fixed by crimping and serving as a movable contact adapted to coact with two fixed contacts 60, 61 slightly turned toward each other and mounted externally on a lower surface of the body 55.

In the embodiment shown in FIGS. 1 and 2, the holding means for the pusher 29 in its lower position, when the switch 27 is stuck in its lower position (FIG. 2) as a result for example of sticking of the metal ring 58 to the two fixed contacts 60, 61, are constituted by a first holding tongue 63 which is fixedly mounted on the pusher 29 and which permanently bears on the lower end 56b of the contact pusher 56 of the switch 27.

As shown in FIGS. 1 and 2, the pusher 29 also permanently bears on the upper end 56a of the contact pusher 56 of the switch 27 by means of a second actuating tongue 65 also fixedly mounted on the pusher 29.

Thus, the sliding pusher of contact 56 of the switch 27 is maintained permanently by its two ends against the two tongues 63, 65 of the pusher 29, such that it always follows the sliding movement given to the pusher 29.

Preferably, the pusher 29 and its two tongues respectively the holding tongue 63 and the actuating tongue 65, are molded as a single piece of plastic material.

As shown in FIGS. 1 and 2, the two tongues 63, 65 of the pusher 29 are straight, extending parallel to each other, and are each mounted in T-shaped relation on this pusher 29, thereby constituting a fork with two teeth between which is mounted in bearing relationship the vertical contact pusher 56 of the switch 27.

Thus, when the cover 15 is correctly secured to the bowl 8, which is to say when the lip 23 of the cover 15 is engaged in the slot 42 of the pushbutton 33 (FIG. 1), the user can push the pushbutton 33 which passes from its start position in which the upper edge 54 of the slot 42 of the pushbutton maintains the lip 23 of the cover 15 bearing against the upper edge 52 of the bulge 35 of the housing (see FIG. 2), thereby preventing opening the cover 15, and, simultaneously, the pusher 29 moves downwardly against the return spring 31; in the course of this movement of the pusher 29, the tongue 65 of the latter, bearing permanently on the upper end 56a of the contact pusher 56 of the switch 27, slides this contact pusher 56 downwardly, whose metallic ring 58 then co-acts with the two fixed conduits 60, 61 so as to close the switch 27 for controlling the electrical supply to the motor 3 (FIG. 2), whilst the tongue 63 of the pusher 29, continuously bearing on the lower end 56b of the contact pusher 56, moves downwardly to the same height as the contact pusher 56.

If now the switch 27 is blocked in its closed condition, FIG. 2, the pusher 29 remains held in lower position thanks to its holding tongue 63 coacting with the lower end 56b of the contact pusher 56 thus blocked, such that the pushbutton 33 secured to the pusher 29 also remains down in its start position in which it prevents the opening of the cover 15. The user must then unplug the apparatus to stop the motor 3.

There is thus provided according to the invention an electrical household appliance with manual control provided with a safety device which is particularly advantageous both from the point of view of its simplicity of manufacture and from the point of view of the optimum safety which it offers to the user both when the cover is not correctly secured on the bowl, and when the apparatus, with the cover correctly secured on the bowl, is in normal or accidental operation because of a blocking of the switch in its closed position.

It will be noted that the above description has been given with reference to a safety device for a slicer with a rotating knife. Of course, this safety device is applicable to any other electric household appliance for food preparation with manual control comprising a rotating working tool that is considered dangerous, such as for example a kitchen robot using various rotatable slicing tools.

What is claimed is:

1. Electric household appliance for the preparation of foodstuffs, comprising a housing (1) supporting a bowl (8) on which is secured a removable cover (15) comprising a lip (23) fixed on the periphery of the cover; said housing enclosing an electric motor group (3) whose output shaft (4) projects from the housing and drives in rotation a working tool (13) disposed in said bowl; and a safety device (25) comprising a switch (27) arranged in the electrical supply circuit of the motor, a pusher (29) for controlling the switch vertically slidably mounted within and at the periphery of the housing (1), associated with a return spring (31), and actuated by a manual control member (33) fixably connected to the pusher (29) and movably mounted on the housing (1) between a stop position and a start position, means (50, 52) permitting on the one hand locking the manual control member (33) in the stop position when the cover (15) is not correctly connected to the bowl (8) such that the pusher (29) remains in an upper position in which it does not actuate the switch (27), and on the other hand unlocking this manual control member (33) in the stop position when the cover (15) is correctly fixed on the bowl (8) such that, by manipulating the control member (33) toward its start position, the pusher (29) comes to occupy by sliding a lower position in which it controls the closure of the switch (27) to permit supply to the motor, as well as retaining means (52, 54) coacting with the lip (23) of the cover (15) to prevent opening this latter when the pusher (29) is moved to its lower position, characterized in that the safety device (25) comprises means (63) permitting holding the pusher (29) in its lower position when the switch (27) is blocked in its closed condition.

2. Electric household appliance according to claim characterized in that the switch (27) comprising a body (55) in which is slidably mounted a vertical contact pusher (56) which has two free ends, respectively an upper end (56a) and a lower end (56b), projecting from the body (55), and which carries, adjacent its lower end (56b), a metallic ring (58) serving as a movable contact adapted to coact with two fixed contacts (60, 61) mounted on said body (55), the pusher (29) bears permanently on the upper end (56a) of the contact pusher (56), and the means for holding the pusher (29) in its lower position are constituted by a first tongue (63) fixedly mounted on the pusher (29) and which continuously bears on the lower end (56b) of the contact pusher (56).

3. Electric household appliance according to claim 2, characterized in that the pusher (29) is laterally spaced from the body (55) of the switch (27) and permanently bears on the upper end (56a) of the contact pusher (56) by means of a second tongue (65) fixedly mounted on the pusher (29).

4. Electric household appliance according to claim 3, characterized in that the pusher (29) and the second tongue (65) are made of a single piece of plastic material.

5. Electric household appliance according to claim 2, characterized in that the pusher (29) and the first tongue (63) are made of a single piece of plastic material.

6. Electric household appliance according to claim 4, characterized in that the first (63) and second (65) tongues are straight, extending parallel to each other, and are each mounted in T-shaped relation on the pusher (29).

7. Electric household appliance according to claim 3, characterized in that the first (63) and second (65) tongues are straight, extending parallel to each other, and are each mounted in T-shaped relation on the pusher (29).

8. Electric household appliance according to claim 6, characterized in that the pusher (29) is laterally spaced from the body (55) of the switch (27) and permanently bears on the upper end (56a) of the contact pusher (56) by means of a second tongue (65) fixedly mounted on the pusher (29).

9. Electric household appliance according to claim 8, characterized in that the pusher (29) and the second tongue (65) are made of a single piece of plastic material.

* * * * *